United States Patent [19]

Hawker et al.

[11] Patent Number: 4,946,711

[45] Date of Patent: * Aug. 7, 1990

[54] MASKING COMPOSITIONS AND METHOD FOR APPLYING THE SAME

[75] Inventors: Fred D. Hawker, Villa Park; Victor E. Pietryga, Berwyn; Robert W. Byrd, Burr Ridge; James Wichmann, Schaumburg; Patricia A. Nicpon, Arlington Heights, all of Ill.

[73] Assignee: DeSoto, Inc., Des Plaines, Ill.

[*] Notice: The portion of the term of this patent subsequent to Feb. 21, 2006 has been disclaimed.

[21] Appl. No.: 285,790

[22] Filed: Dec. 16, 1988

Related U.S. Application Data

[63] Continuation-in-part of Ser. No. 108,430, Oct. 14, 1987, Pat. No. 4,806,390.

[51] Int. Cl.$^5$ .................. B65B 33/00; B05D 1/18; B05D 1/36; B05D 3/02
[52] U.S. Cl. ...................... 427/156; 427/259; 427/327; 427/388.4; 427/409; 427/435; 524/446; 524/519
[58] Field of Search ............ 427/156, 259, 327, 388.4, 427/409, 435; 524/446, 519

[56] References Cited

U.S. PATENT DOCUMENTS

| | | | |
|---|---|---|---|
| 4,191,676 | 3/1980 | Hall | 427/435 X |
| 4,373,050 | 2/1983 | Steinbrecher et al. | 427/435 X |
| 4,806,390 | 2/1989 | Hawker et al. | 427/435 X |

FOREIGN PATENT DOCUMENTS

| | | | |
|---|---|---|---|
| 2540068 | 4/1976 | Fed. Rep. of Germany | 427/435 |
| 1498144 | 1/1978 | United Kingdom . | |

*Primary Examiner*—Michael Lusignan
*Attorney, Agent, or Firm*—Dressler, Goldsmith, Shore, Sutker & Milnamow, Ltd.

[57] ABSTRACT

A method, and aqueous emulsion, for coating a metal part with a peelable mask that is resistant to attack by the strong acid and strong base etchants used in chemical milling are disclosed. The method comprises contacting a polyvalent metal cation salt-surfaced part with an anionic emulsion for a time period effective to coat the part. The anionic emulsion includes coalescent rubbery particles and pigment and has a total solids content of at least about 10 weight percent. The weight ratio of pigment to rubbery particles is about 0.1:1 to about 2:1, respectively.

14 Claims, No Drawings

MASKING COMPOSITIONS AND METHOD FOR APPLYING THE SAME

Cross-Reference to Related Application

This is a continuation-in-part of copending U.S. Application Ser. No. 108,430 filed on Oct. 14, 1987, now U.S. Pat. No. 4,806,390, patented Feb. 21, 1989.

DESCRIPTION

1. Technical Field

This invention relates to aqueous masking compositions that are suitable for use as a removable chemical milling maskant, and includes a method of applying the masking compositions to articles to be chemically milled.

2. Background of the Invention

Chemical milling in which strong acids or alkalis are used to etch away unneeded portions of a metal article is well known, especially in the aircraft industry where it is used to reduce the weight of aircraft parts. In this process, a polymeric mask which resists the etching bath used is applied directly to the metal substrate, as by dipping. The applied mask is then scribed (cut through to base metal) using an appropriate template to allow desired portions of the applied mask to be peeled away to selectively expose those portions of the metal which it is desired to etch.

The character of the etching composition (etchant) varies with the metal of the substrate. To illustrate this, an alkali bath is used to etch aluminum parts, and an acid bath is used to etch titanium parts. The rate at which the exposed metal is removed by the etchant also varies with the etchant's concentration and temperature.

When the etching (chemical milling) process has been completed, the remaining mask is removed, and the etched part is appropriately rinsed, deoxidized if appropriate, and dried. In practice, several dipping and drying steps are required to apply an appropriate mask, ready for scribing.

The normal masking composition used by most aircraft manufacturers today are rubber elastomers dissolved in organic solvents, such as toluene/xylene or perchloroethylene, the latter solvent being frequently employed. The coating systems which are in use are low solids content systems containing a high proportion of volatile organic solvent. The masking compositions are applied in two to three dipping operations in which the panel is dipped in the composition, excess material is dripped off, and the remainder is dried, usually in an oven. This process is then repeated until an appropriate mask thickness has been built up. The process varies depending upon the composition, size and type of part. A commonly used process is outlined below:

1. Apply first coat
2. Bake at 100° F. for 45 minutes
3. Bake at 150° F. for 45 minutes
4. Cool
5. Rotate the part "top for bottom"
6. Apply second coat
7. Bake at 100° F. for 45 minutes
8. Bake at 150° F. for 45 minutes
9. Remove large aluminum parts
10. Leave on conveyor all extrusion, true trim parts, parts shorter than eighteen inches.
11. Apply third coat for parts left in Step
12. Bake at 100° F. for 45 minutes
13. Bake at 150° F. for 45 minutes
14. Remove parts left in Step 10
15. Rack masked titanium parts on separate rack
16. Bake titanium at 225° F. in separate oven
17. Remove titanium parts The masking compositions can also be applied by spraying when the composition is adjusted to the proper viscosity using an above-identified organic solvent. Spray application also requires multiple coats be applied to obtain the desired thickness. Typically, three coats are applied to obtain a thickness of 8 to 10 mils. The more coats that must be applied, the more time consuming the process, which increases costs.

Furthermore, there is a problem with run off of the composition due to the relatively low viscosity. Thus, most of the composition being sprayed does not produce a coat on the part.

Also, run off results in uneven mask thickness and thin spots especially on the corners and edges of the part. The etchant can go through these thin spots and etch the part in undesirable locations. Therefore, more coats must be applied to adequately protect all portions of the part.

The solvents used in these compositions are typically not exempt from government regulations and must be considered as volatile organic content (VOC). Because of the low solids content of the organic solvent system used to apply the mask, the VOC of most of the systems is as high as 1200 grams per liter.

Spray application of the masking composition exacerbates the problem because spraying disperses the solvent in the air which results in the solvent volatilizing more quickly.

One method to reduce the VOC of the masking system is to use solvent recovery to reclaim most of the solvent emitted during the mask application process. However, solvent recovery systems add complexity and expense.

Some aircraft manufacturers are currently using a solvent recovey system in conjunction with the use of perchloroethylene as the solvent in the masking solution. The entire coating system is enclosed, with solvent being recovered from both the dipping and baking areas. The current efficiency of this system is 91%. The solvent is collected and used as a reducer in the masking solution without reprocessing.

The expense of building and operating such a system is obvious, leakage reduces its efficiency, and some solvent is retained in the mask film to be released in subsequent processing. Some solvents, including perchloroethylene, present a known carcinogenic risk that is desirably avoided.

SUMMARY OF THE INVENTION

In accordance with this invention, a part to be coated is surfaced with a layer of polyvalent cationic metal salt and then contacted with an anionic aqueous, emulsion of film-forming coalescent rubbery particles, also referred to as a binder, sensitive to the salt. The anionic emulsion is pigmented to strengthen and harden the film which is formed therefrom. This emulsion has a solids content of at least about 10 weight percent and a pigment to rubbery particles weight ratio, based on solids, of about 0.1:1 to about 2:1, respectively. The salt-surfaced part is contacted with the emulsion causing the emulsion to deposit anionically. Contacting is maintained for a time period effective to form a coating having a dry thickness of at least about 0.5 mil The coated part can be baked to further coalesce the particles and complete the formation of the peelable mask, which is a film.

The anionic emulsion of rubbery particles and pigment is sensitive to cations in salts. That is, the presence of the salt cation breaks the emulsion, and causes the rubbery particles to coalesce (coagulate) and anionically deposit to form a film on a part coated with the salt.

The emulsion can be contacted with the salt-coated part by any conventional method provided the part, or portion of the part, desired to be coated is immersed, i.e., completely covered simultaneously, or sequentially, with the emulsion.

The film coating formed from the emulsion is substantially impervious to the chemical etchant used in the milling process. The formulation of the emulsion can be varied depending upon the etchant to be used.

The salt is applied to the part as an aqueous coagulant solution. This solution also includes a release agent and can include a corrosion inhibitor. The salt is a salt of a polyvalent metal cation that breaks the emulsion and causes coagulation of the rubbery particles and anionic deposition of the film. The release agent is typically silicone-based and is present in an amount effective to facilitate removal of desired portions of the film although good adhesion of the film to the part is still obtained.

The anionically deposited coating can be baked to facilitate removal of the water that is trapped within the gel structure of the coating. This increases the density of the film thereby increasing its imperviousness to the etchant.

Drying, by baking or air drying, also causes migration of the salt from the part through the film and to the film surface where it is again available to cause anionic deposition of an optional second film.

This second film can be formed from the emulsion of the present invention or from a commercially available coating composition such as a latex. This second film enhances sealing of the part.

As is evident, many of the problems of the prior art solvent-based systems are overcome by use of the present invention.

The emulsions of the present invention are anionically deposited on a part to provide a coating that can be selectively removed to expose portions of the part. The portions of the part that remain coated are protected from an etchant by the coating.

Numerous other advantages and features of the present invention will become readily apparent from the following description of the preferred embodiments of the invention, the accompanying examples and the appended claims.

DETAILED DESCRIPTION OF THE PREFERRED EMBODIMENTS

Although this invention is susceptible to embodiment in many different forms, preferred embodiments of the invention are described herein in detail. It should be understood, however, that the present description is to be considered as an exemplification of the principles of this invention and is not intended to limit the invention to the embodiments illustrated.

The present invention is directed to a method of coating a part with an aqueous, anionic emulsion comprising coalescent rubbery particles, also known as a binder, and pigment. The anionic emulsion, suitable for use as a removable chemical milling maskant for a part, is sensitive to a polyvalent metal cation salt deposited on the part. Thus, the salt breaks the emulsion upon contact therewith causing the rubbery particles to be anionically deposited as a gel coating on the part, coalesce, and thus form a continuous film on the part. The pigment present in the emulsion is also deposited and strengthens and hardens the mask film that is formed.

The emulsion has a solids content of at least about 10 weight percent and a pigment to rubbery particles weight ratio, based on solids, of about 0.1:1 to about 2:1, respectively.

The contacting of the salt and emulsion is for a time period effective for causing anionic deposition of the emulsion to form a coating having a dry thickness of at least about 0.5 mil. The thusly coated part can then be baked to complete formation of the peelable mask which is a film on the part.

A film of the present emulsion can be cut using either a hot or cold knife so that a portion thereof can be peeled away from the part without removing the other sections.

The parts to be etched are typically made of metal.

The emulsion is usually formulated with deionized or distilled water.

A rubbery polymer is selected to provide the rubbery particles. The choice of rubbery polymer, or combination of rubbery polymers, is based upon the individual characteristics of the particular chemical milling process. Factors that can be considered include composition of the part to be etched, etchant to be utilized, etching time, dimensional tolerances and the like. Any rubbery polymer that deposits anionically on a cationic polyvalent metal salt-coated part and that provides the needed resistance to the strong acids or strong bases that are typically used as etchants is suitable.

Illustrative suitable rubbery polymers include polychloroprene homopolymers, styrene butadiene, elastomeric acrylic polymeric emulsions, polyurethane latices, natural rubber latices, nitrile rubber latices and the like. Mixtures of two or more rubbery polymers can also be utilized.

A preferred anionic rubbery polymer is a Neoprene resin latex supplied by du Pont under the trade designation Neoprene 842A. Neoprene is a polychloroprene homopolymer having a solids content of about 50 weight percent in water and is preferred because of its outstanding resistance to strong acids and bases.

Typically, films of non-pigmented emulsions of coalescent rubbery particles are flexible and are torn, rather than cut, by a sharp knife when attempting to scribe the film. These films have a relatively low tensile strength of about 700 psi and are relatively soft, having a Durometer A hardness of only 55.

The present emulsion is pigmented to add stiffness and strength to the deposited film which can then be scribed and removed accurately. The tensile strength of the film peaks at a pigment to rubbery particles weight ratio of about 0.5:1, respectively. A film having a pigment to rubbery particles weight ratio of about 0.5:1, respectively, has a tensile strength of about 1500 psi and is relatively hard, having a Durometer A hardness of 72. However, maximization of tensile strength is not required to practice this invention. For example, a film having a pigment to rubbery particles ratio of about 1:1 has a tensile strength of 900 psi and a Durometer A hardness of 85. This film is an effective peelable chemical milling maskant.

Illustrative pigments include finely divided clay, talc, calcium carbonate, silica, carbon black, aluminum silicate and mixtures thereof.

Neutral clay is a preferred pigment. Illustrative of suitable neutral clays are Fuller's earth, bentonite, attapulgite, smectite and combinations thereof. Neutral clays are clays that have a pH value of about 5 to about 9 as determined by a 5 weight percent slurry of clay in distilled water that is agitated for three minutes prior to measurement of the pH value by a conventional pH meter. An illustrative finely divided neutral clay is commercially available from Englehart Chemical Co., Menlo Park, NJ, under the trade designation ASP 602. Other illustrative finely divided neutral clays include attapulgite-smectite clays available from Oil-Dri Corporation of America, Chicago, Illinois, under the trade designations Pure-Flo B80 or Pure-Flo F65.

Typically, the finely divided clay has a particle size of about 5 to about 20 microns.

The weight ratio of pigment to rubbery particles is an indication of the critical pigment volume concentration (CPVC) of the emulsion. It is desired to maintain the CPVC at a level that provides stiffness and strength and reduces tackiness of the film without introducing porosity to the film. A properly selected CPVC meets these needs without requiring a latex overcoat to compensate for excessive porosity in the film. A relatively higher pigment to rubbery particle weight ratio is desirable in some applications where a relatively thicker maskant that deposits relatively more quickly is desired.

As noted previously, the weight ratio of pigment to rubbery particles is about 0.1:1 to about 2:1. Preferably, the weight ratio is about 0.3:1 to 1:1, respectively. When a heavily pigmented emulsion system is desired, the weight ratio of pigment to rubbery particles is about 0.75:1 to 1:0.57, respectively.

The total solids content of the aqueous emulsion is variable. An emulsion having a total solids content of about 10 weight percent provides satisfactory coverage of a part relatively quickly as does an emulsion having a solids content of about 20 to about 50 weight percent. A total solids content of at least about 45 percent or at least 55 weight percent is also suitable for some applications. Satisfactory coverage indicates that the maskant is uniformly anionically deposited to the required thickness and a coating so deposited does not pull away from the edges of the part being masked. Additionally, heavy pigmentation further ensures that the deposited film will not be fluffy.

The toughness and strength of the film can also be enhanced by selection of a mixture of rubbery polymers. For example, utilizing up to about 25 weight percent of styrene butadiene, based on the weight of rubbery particles, increases toughness and strength of the film.

Alternatively, a strength and toughness additive can be present in the emulsion. An illustrative additive is a polyvinylidene chloride latex emulsion commercially available under the trade designation Daran 143, commercially available from W. R. Grace & Co., New York, NY. This additive can be present in an amount of about 0.5 weight percent to about 5 weight percent based on the rubbery particles.

A conventional curing agent to cure the rubbery polymer is present in an amount effective to cure the polymer. These agents and their proportion of use are well known. A preferred curing agent is zinc oxide, but magnesium oxide is also effective.

Other conventional components include antioxidants, such as 2,2-methylene-bis(4-methyl-6-tertiary-butylphenyl)methane; chelating agents, such as ethylene diamine tetraacetic acid or another tetrasodium salt of ethylene diamine tetracetic acid; anti-foaming agents such as Drewplus L475, commercially available from Drew Chemical Corp., Boonton, NJ; colorants such as phthalo blue colorant; anionic, cationic or nonionic surfactants, present in an amount effective to maintain a stable emulsion, such as Dresinate 731, an anionic sodium salt of a modified rosin, commercially available from Hercules, Wilmington, DE, further illustrative surfactants include Darvan NS and W.A.Q. commercially available from R. T. Vanderbilt; and glycine to adjust the pH of the emulsion. An organic solvent can be present in a minor amount although the emulsion preferably does not utilize one.

Typically, the pH value of the emulsion is about 9 to about 11. The pH value is selected to obtain a stable emulsion.

Unlike conventional practice of incorporating the pigment into the water and then adding the other materials, all of the components are preferably combined and admixed together at the same time to form a useful emulsion. This minimizes the water content and helps to provide the high total solids content that can be desired. Although it is preferred in some applications to achieve high solids content using the mixing procedure specified above, this is not essential, and under appropriate conditions one can minimize the water content in other ways. Also, the water content of the latex composition can be reduced to minimize shipping costs and storage volume, the user adding water subsequently to obtain the desired solids content.

The multivalent metal cation salts and their application in an aqueous medium to an object to be coated with an anionic emulsion are themselves well known and do not constitute the essence of what has been contributed herein. The salt is present in an aqueous coagulant solution or bath. Salts that are suitable for use in the present invention are those to which the emulsion is sensitive. These salts break the emulsion and cause the rubbery particles to coalesce on a part that is coated with the salt. Illustrative of the salts useful in the present invention are calcium nitrate, zinc chloride, magnesium sulfate, magnesium phosphate, barium nitrate, aluminum trichloride and the like. Mixtures of two or more salts can also be utilized.

The water used in the coagulant solution is preferably distilled or dionized.

The coagulant solution contains about 200 to about 400 pounds of the multivalent metal cation salt, preferably about 300 pounds of salt per 100 gallons of aqueous coagulant solution.

The above emulsion when anionically deposited adheres to substrates coated with the salt somewhat more strongly than desired, and this makes it difficult to obtain a clean peel, i e., completely remove the desired portion of mask. It is desired to have a peel strength of about 10 to about 20 inch pounds per linear inch. High peel strength can be tolerated, or it can be reduced by adding a conventional release agent such as a silicone release agent to the coagulant solution. The release agent is present in an amount effective to facilitate removal of the mask. The release agent, typically 30 weight percent solids in water, is used in an amount of about 0.5 to about 3 pounds per 100 gallons of coagulant solution.

The coagulant solution can further include a conventional soluble corrosion inhibitor, such as sodium bichromate. However, chromates raise environmental concerns due to their hazardous nature. Therefore, non-chromate corrosion inhibitors that are soluble in the aqueous coagulant bath are useful and are illustrated by Sicorin RZ, commercially available from BASF. These non-chromate inhibitors are conventional. The coagulant solution can include the corrosion inhibitor in an amount effective to inhibit localized corrosion. Illustrative of this amount is about 10 pounds of the soluble chromate corrosion inhibitor per 100 gallons of coagulant solution or about 20 pounds of non-chromate corrosion inhibitor per 100 gallons of coagulant solution.

A conventional surfactant can also be present in the coagulant solution in an amount effective to ensure wetting of the substrate. An illustrative surfactant is a nonionic polyethoxylated alkyl phenol surfactant commercially available under the trade designation Igepal CA-630 from GAF Corp., New York, NY.

The aqueous coagulant solution typically contains, per 100 gallons of solution, 300 pounds of calcium nitrate, 2 pounds of silicone release agent, 10 pounds of sodium bichromate and 1 weight percent of surfactant.

The coagulant solution is applied by contacting the solution with the part preferably with either or both at an elevated temperature, e.g., a temperature of about 60° C. The method of application of the coagulant solution is discretionary provided the part is covered with coagulant solution in an amount effective to cause anionic deposition. Therefore, the part can be dipped in a reservoir of the coagulant solution or the solution can be sprayed or otherwise applied onto the part.

The wet part can then be dried in a forced hot air oven at a temperature of about 60° C. to about 80° C. for a time period of about five to about ten minutes. Drying is not necessary if the coagulant solution is not flowing off of the part.

The method whereby the emulsion is applied to and contacted with the salt coated part is discretionary provided that anionic deposition occurs. Preferably, the metal part is immersed, i.e., completely surrounded at one time or sequentially, by the emulsion. Illustrative methods of applying the emulsion include spraying, dipping in a reservoir and similar conventional coating methods.

Referring more particularly to the anionic deposition process under consideration, the part to be masked is first coated with a thin layer of a multivalent metal cation salt to act as a coagulant for the anionic emulsion. This is conveniently accomplished by dipping the part in water in which the multivalent salt and release agent have been dissolved or dispersed and then drying the part after its removal from the aqueous coagulant solution Alternatively, the aqueous coagulant solution can be sprayed on to the part.

Promptly after drying (to minimize moisture pick-up) the room temperature, salt-surface, dried part is then immersed in the anionic emulsion for a time period sufficient to anionically deposit a mask having the desired film thickness.

A dry thickness of at least about 0.5 mil is desired. An appropriate dry thickness is from about 0.008 to about 0 020 inches, preferably about 0.010 to about 0.012 inches, and it is deposited thereon in typically less than two minutes, usually in about one minute. The film is initially anionically deposited relatively quickly, 90 percent of the film thickness being built up within the first 30 seconds.

The term "dry thickness", as used herein in its various grammatical forms, indicates the thickness of the film after the water is removed.

The coated part can then be rinsed, as by dipping it into an aqueous rinse solution to remove excess emulsion before drying and baking the coated part. The rinse operation is not always necessary.

The coated part is then air dried for a time period and at a temperature effective to reduce the water content thereof to effect film coalescence Baking at elevated temperatures can then be utilized to facilitate film formation. For example, after air drying at ambient conditons for about 10 minutes, the part can be cured at a temperature of about 190° F. for a time period of about one hour.

The stiffness and strength of the film is essential to obtain accurate cutting and removal of the film. For these purposes, a dried film of the anionically deposited emulsion having a Durometer A hardness of about 65 to about 90 is effective.

Air drying or baking of the film causes salt to migrate from the part to an exterior surface of the film where it is available, if desired, to cause anionic deposition of another layer of film of the emulsion of the present invention or of another latex composition.

A latex seal coat can be applied to enhance sealing of the metal surface. This coat is normally less than 2 mils in thickness when dry when a nonionic latex is used. However, when an anionic latex or a blend including an anionic latex is used, a dry thickness of about 2 to about 5 mils is preferred. The seal coat can be applied by conventional means including dipping, spraying and the like.

The latex seal coat composition is a conventional, commercially available, product that is conventionally modified as known in the paint technology art to obtain the desired properties, e.g., wetting and room temperature coalescence. Conventional modification of the seal coat composition includes the addition of wetting agents and coalescence agents that facilitate coalescence at room temperature when the glass transition temperature of the polymeric portion of the commercial product is greater than room temperature. Some commercial products do not coalesce at room temperatures, and therefore solvents are added to obtain a continuous film.

A 90 percent vinylidene chloride/10 percent butyl acrylate copolymer latex available under the trade designation Polidene 33-004 commercially available from Pacific Scott Bader Inc., Richmond, CA, can be used for the seal coat, but other latices and aqueous dispersions are also useful A blend of latex compositions including a styrene-butadiene copolymer commercially available under the trade designation Tylac 68-010 from Reichhold Chemical Co., Elizabeth, NJ blended with an anionic salt-sensitive latex commercialy available under the trade designation DL 2065 from Reichhold Chemical Co. is also suitable as the seal coat.

The cured part is dipped in a dilute aqueous solution of the seal coat composition, air dried for 30 minutes and then baked for a time period of about 30 minutes at a temperature of about 240° F.

Alternatively, the cured part can be rinsed in an aqueous solution to remove the salt if anionic deposition of another coat is not desired.

The formulations of anionic emulsions presented in TABLES I and II, below, are provided as illustrations of typical formulations of the present invention and are presented by way of illustration and not limitation

TABLE I

| | Formulation of Anionic Emulsion | |
|---|---|---|
| No. | Component | Parts by Wt. |
| 1 | Anionic rubbery latex[1] | 46 |
| 2 | Polyvinylidene chloride latex[2] | 1.1 |
| 3 | Zinc oxide | 2.5 |
| 4 | Clay[3] | 48 |
| 5 | Antifoaming agent[4] | 0.5 |
| 6 | Antioxidant[5] | 0.8 |
| 7 | Chelating agent[6] | 0.05 |
| 8 | Surfactant[7] | 1.00 |
| 9 | Glycine | to adjust pH |
| 10 | Water | to adjust to 64 weight percent solids |

[1]The du Pont product Neoprene 842A is a rubbery polymer that was used.
[2]Daran 143 commercially available from W. R. Grace & Co., New York, NY was used.
[3]ASP 602, a finely divided neutral clay commercially available from Englehart Chemical Company of Menlo Park, NJ was used.
[4]Drewplus L475 commercially available from Drew Chemical Corporation, Boonton, NJ was used.
[5]2,2-methylene-bis(4-methyl-6-tertiary-butyl-phenyl)methane.
[6]Tetrasodium salt of ethylene diamine tetracetic acid.
[7]Anionic sodium salt of a modified rosin surfactant, such as Dresinate 731 commercially available from Hercules, Wilmington, DE was used.

It is desired to point out that components No. 5, 6, 7 and 9 are optional components and are used for best performance, but they are not essential.

All of the components of TABLE I are combined and admixed together at the same time. In the above formulation the total solids content is 64 weight percent and the pigment content is 33 weight percent of the solids. The usual pH value is in the range of about 9-11.

A coagulant solution including calcium nitrate and a silicone release agent was prepared and applied to an aluminum part by a method discussed hereinabove..

Subsequently, a composition of the forumlation of TABLE I was applied to the salt-coated part by dipping the part in a reservoir of the composition to produce an anionically deposited film having the desired thickness.

The thusly produced film was cut and selectively peeled away as desired. The portions of the film remaining on the part protected it from an etchant.

TABLE II

| | Formulation of Sprayable Anionic Emulsion | |
|---|---|---|
| No. | Component | Parts by Wt. |
| 1 | Water | to adjust to 32.5 percent solids |
| 2 | Anionic rubbery latex[1] | 44.3 |
| 3 | Zinc oxide | 2.5 |
| 4 | Clay[2] | 10.8 |
| 5 | Antifoaming agent[3] | 0.5 |
| 6 | Antioxidant[4] | 0.8 |
| 7 | Chelating agent[5] | 0.05 |
| 8 | Surfactant[6] | 1.00 |
| 9 | Glycine | to adjust pH |

[1]The du Pont product Neoprene 842A is a rubbery polymer that was used.
[2]ASP 602, a finely divided neutral clay commercially available from Englehart Chemical Company of Menlo Park, NJ was used.
[3]Drewplus L475 commercially available from Drew Chemical Corporation, Boonton, NJ was used.
[4]2,2-methylene-bis(4-methyl-6-tertiary-butyl-phenyl)methane.
[5]Tetrasodium salt of ethylene diamine tetracetic acid.
[6]Anionic sodium salt of a modified rosin surfactant, such as Dresinate 731 commercially available from Hercules, Wilmington, DE was used.

It is desired to point out that components No. 5, 6, 7, and 9 are optional components and are used for best performance, but they are not essential.

All the components of TABLE II are combined and admixed together at the same time. In the above formulation the total solids content is about 32.5 weight percent and the pigment to rubbery particles weight ratio is 0.5:1, respectively.

A coagulant solution including calcium nitrate and a silicone release agent was prepared and applied to an aluminum part by a method discussed hereinabove.

Subsequently, a composition of the formulation of TABLE II was applied to the part by spray application. Three passes in rapid succession of spray application provided a film having a dry thickness after baking of about 9 mils. The thusly produced film was cut and selectively peeled away as desired. The portions of the film remaining on the part protected it from an etchant.

A composition of the formulation of TABLE II was also applied to an aluminum part that was not salt-coated. Three passes in rapid succession of spray application resulted in no significant coating of the part as much of the composition ran off of the part. This indicates that anionic deposition is the coating mechanism, and it occurs only when the part is coated with salt.

To further increase the toughness and strength of the deposited film, the formulation of TABLE II can be modified by replacing about 7.5 parts by weight of the anionic rubbery latex with styrene butadiene. Alternatively, the toughness and strength can also be increased by replacing about 1 part by weight of the anionic rubbery latex with a polyvinylidene rubbery latex such as Daran 143, commercially available for W. R. Grace and Co., New York, NY.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

What is claimed is:

1. A method of coating an etchable metal part with a peelable mask which is resistant to attack by the strong acid and strong base etchants used in chemical milling comprising coating said part with a layer of polyvalent metal cation salt, contacting said salt-surfaced metal part with an anionic emulsion of coalescent rubbery particles pigmented to strengthen the mask which is formed, said emulsion having a total solids content of at least about 10 weight percent and a weight ratio of pigment to rubbery particles of about 0.1:1 to about 2:1, respectively, the contacting between said salt-surfaced part and said emulsion being for a time period effective to cause said emulsion to deposit anionically to form a coating having a dry thickness of at least about 0.5 mils.

2. The method in accordance with claim 1 wherein the weight ratio of pigment to rubbery particles is about 0.3:1 to about 1:1, respectively.

3. The method in accordance with claim 1 wherein the total solids content of said emulsion is about 20 to about 50 weight percent.

4. The method in accordance with claim 1 further comprising the step of drying the coating and wherein drying the coating causes migration of salt from the part to an exterior surface of the mask.

5. The method in accordance with claim 4 wherein the dried coating is overcoated with a seal coat.

6. The method in accordance with claim 1 wherein the coating has a dry thickness of about 0.008 to about 0.020 inches.

7. The method in accordance with claim 6 wherein the coating has a dry thickness of about 0.010 to about 0.012 inches.

8. The method in accordance with claim 1 wherein the pigment is a finely divided clay.

9. The method in accordance with claim 1 wherein the anionic emulsion further comprises a curing agent for the rubbery particles.

10. The method in accordance with claim 9 wherein the curing agent is zinc oxide.

11. The method in accordance with claim 1 wherein the contacting is by spray application.

12. A method of coating an etchable metal part with a peelable mask which is resistant to attack by the strong acid and strong base etchants used in chemical milling comprising the steps of;
    coating said metal part with a layer of polyvalent metal cationic salt; and
    contacting said salt-surfaced metal part with an anionic emulsion comprising coalescent rubbery particles pigmented to strengthen the mask which is formed, said emulsion having a solids content of about 20 to about 50 weight percent and a weight ratio of pigment to rubbery particles of about 0.3:1 to about 1:1, respectively, maintaining the contacting for a time period effective for causing said emulsion to deposit anionically until a coating having a dry thickness of at least about 0.5 mil is deposited.

13. A method of coating an etchable metal part wit peelable mask which is resistant to attack by the strong acid and strong base etchants used in chemical milling comprising the steps of:
    contacting said part with an aqueous coagulant solution comprising water, a multivalent metal cation salt and release agent, in an amount effective to facilitate removal of the mask, to cover said part with coagulant solution in an amount effective to cause anionic deposition; and then,
    contacting said part with an anionic emulsion of coalescent rubbery particles pigmented to strengthen and harden the mask which is formed, the contacting between said coagulant solution covered part and said anionic emulsion being for a time period effective to cause said emulsion to deposit anionically to form a coating having a dry thickness of at least about 0.5 mil.

14. The method in accordance with claim 13 further comprising the step of drying said coagulant solution covered part before contacting with said anionic emulsion.

* * * * *